United States Patent
Okada et al.

(10) Patent No.: US 11,366,614 B2
(45) Date of Patent: Jun. 21, 2022

(54) STORAGE SYSTEM

(71) Applicant: Hitachi, Ltd., Tokyo (JP)

(72) Inventors: Naoya Okada, Tokyo (JP); Tomohiro Yoshihara, Tokyo (JP); Sadahiro Sugimoto, Tokyo (JP); Takashi Ochi, Tokyo (JP); Jun Miyashita, Tokyo (JP); Toshiya Seki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/022,360

(22) Filed: Sep. 16, 2020

(65) Prior Publication Data

US 2021/0200473 A1 Jul. 1, 2021

(30) Foreign Application Priority Data

Dec. 27, 2019 (JP) .............................. JP2019-239672

(51) Int. Cl.
*G06F 3/06* (2006.01)

(52) U.S. Cl.
CPC .......... *G06F 3/0659* (2013.01); *G06F 3/0619* (2013.01); *G06F 3/0622* (2013.01); *G06F 3/0653* (2013.01); *G06F 3/0656* (2013.01); *G06F 3/0658* (2013.01); *G06F 3/0673* (2013.01)

(58) Field of Classification Search
CPC .... G06F 3/0659; G06F 3/0656; G06F 3/0673; G06F 3/0619
See application file for complete search history.

(56) References Cited

U.S. PATENT DOCUMENTS

| | | | |
|---|---|---|---|
| 2015/0134891 A1* | 5/2015 | Jo | G06F 13/28 711/103 |
| 2016/0070647 A1* | 3/2016 | Shigeta | G06F 12/0862 711/103 |
| 2017/0286305 A1* | 10/2017 | Kalwitz | G06F 12/0862 |
| 2019/0065404 A1* | 2/2019 | Kabra | G06F 12/0871 |
| 2020/0192601 A1 | 6/2020 | Okada et al. | |
| 2021/0109656 A1* | 4/2021 | Lyu | G06F 3/0613 |
| 2021/0141559 A1* | 5/2021 | Kim | G06F 3/0613 |

FOREIGN PATENT DOCUMENTS

WO  WO 2017/195324 A1  11/2017

OTHER PUBLICATIONS

Intel® Virtualization Technology for Directed I/O, Architecture Specification, Jun. 2019, Rev. 3.1, Order No. D51397-011.

* cited by examiner

*Primary Examiner* — Edward J Dudek, Jr.
(74) *Attorney, Agent, or Firm* — Baker Botts L.L.P.

(57) ABSTRACT

The storage system includes a controller and a storage drive accessible from the controller. The controller includes a memory and a processing unit. The memory includes a first cache area in which the writing of data by the storage drive is permitted, and a second cache area in which the writing of data by the storage drive is prohibited. A In the first cache area, the storage of data, by staging-in-advance in response to a read request for a sequential read, by the processing unit is permitted, and the storage of cache data in a dirty state by the processing unit is prohibited. In the second cache area, the storage of the cache data in the dirty state by the processing unit is permitted.

9 Claims, 14 Drawing Sheets

FIG. 4

| VIRTUAL DRIVE ID | PHYSICAL DRIVE ID |
|---|---|
| 0 | 1 |
| 1 | 3 |
| 2 | 5 |
| 4 | 7 |
| 5 | 2 |
| 6 | 4 |
| 9 | 6 |
| 10 | 8 |
| ⋮ | ⋮ |

FIG. 5

| DRIVE ID | PHYSICAL ADDRESS | PAGE SIZE | MEMORY ACCESS ATTRIBUTE | |
|---|---|---|---|---|
| | | | Read | Write |
| 0 | 0x0_0000_0000 | 1 GB | Disallowed | Disallowed |
| | ⋮ | ⋮ | ⋮ | ⋮ |
| | 0x5_C000_0000 | 1 GB | Disallowed | Disallowed |
| | 0x6_0000_0000 | 1 GB | Allowed | Allowed |
| | ⋮ | ⋮ | ⋮ | ⋮ |
| | 0x3F_C000_0000 | 1 GB | Allowed | Allowed |
| | 0x40_0000_0000 | 1 GB | Allowed | Allowed |
| | ⋮ | ⋮ | ⋮ | ⋮ |
| | 0x5F_C000_0000 | 1 GB | Allowed | Allowed |
| | 0x60_0000_0000 | 1 GB | Allowed | Disallowed |
| | ⋮ | ⋮ | ⋮ | ⋮ |
| | 0x7F_C000_0000 | 1 GB | Allowed | Disallowed |
| | 0x80_0000_0000 | 1 GB | Disallowed | Disallowed |
| | ⋮ | ⋮ | ⋮ | ⋮ |
| | 0x7_FFFF_C000_0000 | 1 GB | Disallowed | Disallowed |
| 1 | 0x0_0000_0000 | 1 GB | Disallowed | Disallowed |
| | ⋮ | ⋮ | ⋮ | ⋮ |
| | 0x5_C000_0000 | 1 GB | Disallowed | Disallowed |
| | 0x6_0000_0000 | 1 GB | Allowed | Allowed |
| | ⋮ | ⋮ | ⋮ | ⋮ |
| | 0x3F_C000_0000 | 1 GB | Allowed | Allowed |
| | 0x40_0000_0000 | 1 GB | Allowed | Disallowed |
| | ⋮ | ⋮ | ⋮ | ⋮ |
| | 0x5F_C000_0000 | 1 GB | Allowed | Disallowed |
| | 0x60_0000_0000 | 1 GB | Allowed | Allowed |
| | ⋮ | ⋮ | ⋮ | ⋮ |
| | 0x7F_C000_0000 | 1 GB | Allowed | Allowed |
| | 0x80_0000_0000 | 1 GB | Disallowed | Disallowed |
| | ⋮ | ⋮ | ⋮ | ⋮ |
| | 0x7_FFFF_C000_0000 | 1 GB | Disallowed | Disallowed |
| ⋮ | ⋮ | ⋮ | ⋮ | ⋮ |

STORAGE SYSTEM

CLAIM OF PRIORITY

The present application claims priority from Japanese patent application JP 2019-239672 filed on Dec. 27, 2019, the content of which is hereby incorporated by reference into this application.

BACKGROUND OF THE INVENTION

1. Field of the Invention

The present invention relates to a storage system.

2. Description of the Related Art

A storage system has a controller and a plurality of storage drives. The controller is connected to a plurality of storage drives via a back-end switch. As a communication standard between the controller and the storage drive, serial attached SCSI (small computer system Interface) (SAS) is used in general. The SAS communication path requires a dedicated interface that performs communication processing of each protocol. The storage system having the SAS communication path can prevent the writing of corrupted data and the like, so that high reliability can be achieved.

In recent years, non-volatile memory express (NVMe) has been used as one of new communication standards. In a storage system employing NVMe, a controller and a storage drive are connected via a peripheral component interconnect express bus (PCIe bus). The storage drive can directly access a memory contained in the controller. With the use of NVMe eliminating the need for processing the SAS protocol, the performance of IO processing can be expected to be improved.

In the storage system employing NVMe, a control for ensuring reliability such as the SAS protocol is not performed, and hence it is impossible to prevent the transfer of corrupted data from a storage drive. In contrast, a technique described in International Publication No. 2017/195324 is known.

International Publication No. 2017/195324 describes a method of rewriting an IO page table as necessary to control access from a storage drive in order to avoid the destruction of data due to the writing of corrupted data to a cache area.

SUMMARY OF THE INVENTION

In IO processing accompanied by the rewriting of an IO page table as in processing described in International Publication No. 2017/195324, the IO performance deteriorates. When failure occurs in the controller, data in a dirty state stored in the cache area is lost. An object of one aspect of the present invention is to achieve a storage system having high reliability and high IO performance.

A storage system according to one aspect of the present invention includes a controller and a storage drive accessible from the controller. The controller includes a memory and a processing unit. The memory includes a first cache area in which writing of data by the storage drive is permitted, and a second cache area in which writing of data by the storage drive is prohibited. In the first cache area, the storage of data, used by staging-in-advance in response to a read request for a sequential read, by the processing unit is permitted, and the storage of cache data in a dirty state by the processing unit is prohibited. In the second cache area, the storage of the cache data in the dirty state by the processing unit is permitted.

According to one aspect of the present invention, a storage system having high reliability and high IO processing performance can be achieved. Problems, structures, and effects other than those described above will be described in the following examples.

BRIEF DESCRIPTION OF THE DRAWINGS

FIG. 4 is a diagram showing an example of storage drive correspondence information included in control information of the first embodiment;

FIG. 5 is a flowchart illustrating a cache area selection process in the IO process executed when the storage system of the first embodiment receives a read request.

DESCRIPTION OF THE PREFERRED EMBODIMENTS

Figure 1:
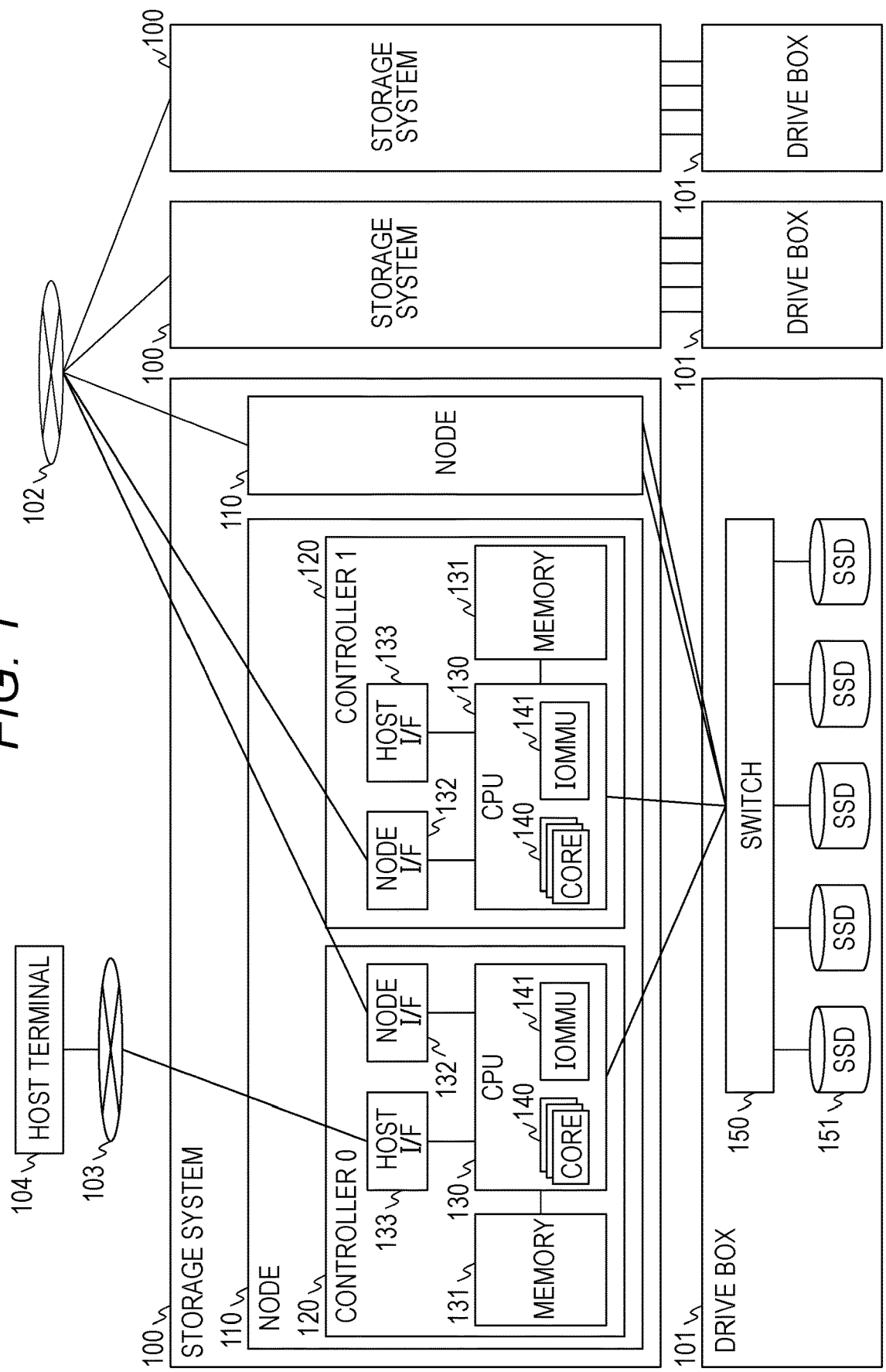
FIG. 1 is a diagram showing an example of a configuration of a computational system according to a first embodiment.

Examples of the present invention will be described below with reference to the drawings. However, the present invention is not limited to the description of the following examples. It is readily understood by those skilled in the art that the specific structure of the present invention can be changed without departing from the spirit or purpose of the present invention. In the configuration of the invention described below, the same or similar configuration or function will be denoted by the same reference numerals, and a redundant description will be omitted. The expressions "first," "second," "third," and the like used in the specification and the like are used to identify components and are not necessarily limit the number or order thereof.

First Embodiment

FIG. 1 is a diagram showing an example of a configuration of a computational system according to a first embodiment. The computational system includes a plurality of storage systems 100, a plurality of drive boxes 101, and a host terminal 104. The plurality of storage systems 100 are connected to each other via a network 102. The host terminal 104 is connected to at least one storage system 100 via a network 103.

Note that the configuration of the computational system shown in FIG. 1 is an example and is not limited thereto. For example, the storage system 100 and the drive box 101 may be integrated. The host terminal 104 and the storage system 100 may constitute a hyper-converged system tightly coupled by hardware and software.

The networks 102, 103 may be, for example, a storage area network (SAN), a local area network (LAN), or a wide area network (WAN). The connection system of each of the networks 102, 103 may be either wireless or wired.

The host terminal 104 is a computing machine that writes data to a storage area provided by the storage system 100 and reads data from the storage area. The host terminal 104 includes a computer processing unit (CPU), a memory, and an interface (not shown).

The drive box 101 is a device that accommodates a plurality of storage drives 151. The drive box 101 includes a switch 150 and a plurality of storage drives 151. The plurality of storage drives 151 may constitute a group of redundant arrays of inexpensive disks (RAID). The storage system 100 may generate a logical unit (LU) on the RAID group as a storage area to be provided to the host terminal 104.

The switch 150 connects a CPU 130 included in a controller 120 of the storage system 100 and the storage drive 151. The CPU 130 is a processing unit. The controller 120 can access the storage drive 151 via the switch 150. In the first embodiment, a connection is made between the CPU 130 and the switch 150, as well as between the storage drive 151 and the switch 150, via a PCIe bus. The switch 150 includes a plurality of ports that are connected to the storage drives 151. The switch 150 expands the number of ports of the PCIe bus. The switch 150 may be omitted, and the storage drive 151 may be directly connected to the CPU 130.

The storage drive 151 is a device that provides a storage area to be used by the host terminal 104. The storage drive 151 of the first embodiment is typically an NVMe drive that communicates with the CPU via a PCIe bus and performs a process conforming to the NVMe protocol. Note that the storage drive 151 may include serial advanced technology attachment (SATA) drive or the like.

In FIG. 1, a highly available dual-port NVMe solid-state drive (NVMeSSD) is shown as an example of the storage drive 151. Note that the protocol and the communication path of the storage drive 151 are not limited, and the storage drive 151 may be a communication path such as Ethernet so long as being able to perform read and write on a memory 131 of the plurality of nodes 110 by a communication path except for the PCIe bus.

The storage system 100 provides a storage area to the host terminal 104. The storage system 100 includes a plurality of nodes 110 and is connected to a drive box 101. The node 110 is a device for controlling the storage system 100 and includes a plurality of controllers 120. The controller 120 includes a CPU 130, a memory 131, a node interface 132, and a host interface 133.

The CPU 130 is a processor for performing various operations and includes a plurality of cores 140 and input/output memory management units (IOMMUs) 141. The CPU 130 executes a program stored in the memory 131. The CPU 130 executes processing in accordance with a program to operate as a function unit for achieving a specific function.

The core 140 is hardware for executing arithmetic processing. Based on an IO page table 223 (cf. FIG. 2), the IOMMU 141 controls access to the memory 131 by the storage drive 151 connected to the CPU 130 via the PCIe bus.

The memory 131 is a storage device made up of at least a volatile storage element such as a dynamic random-access memory (DRAM), and a non-volatile storage element such as a NAND Flash, a spin transfer torque random access memory (STT-RAM), and a phase-change memory (PCM). A storage area for storing a program to be executed by the CPU 130 and various pieces of information, and a storage area for temporarily storing user data are set in the memory 131.

The node interface 132 is an interface for connection to the node 110. The node interface 132 is, for example, a Fibre Channel adapter or an Ethernet adapter.

The host interface 133 is an interface for connection to the host terminal 104. The host interface 133 may be an Ethernet adapter (Ethernet is a registered trademark), InfiniBand, a Host Bus adapter, a PCI Express bridge, or the like.

Figure 2:
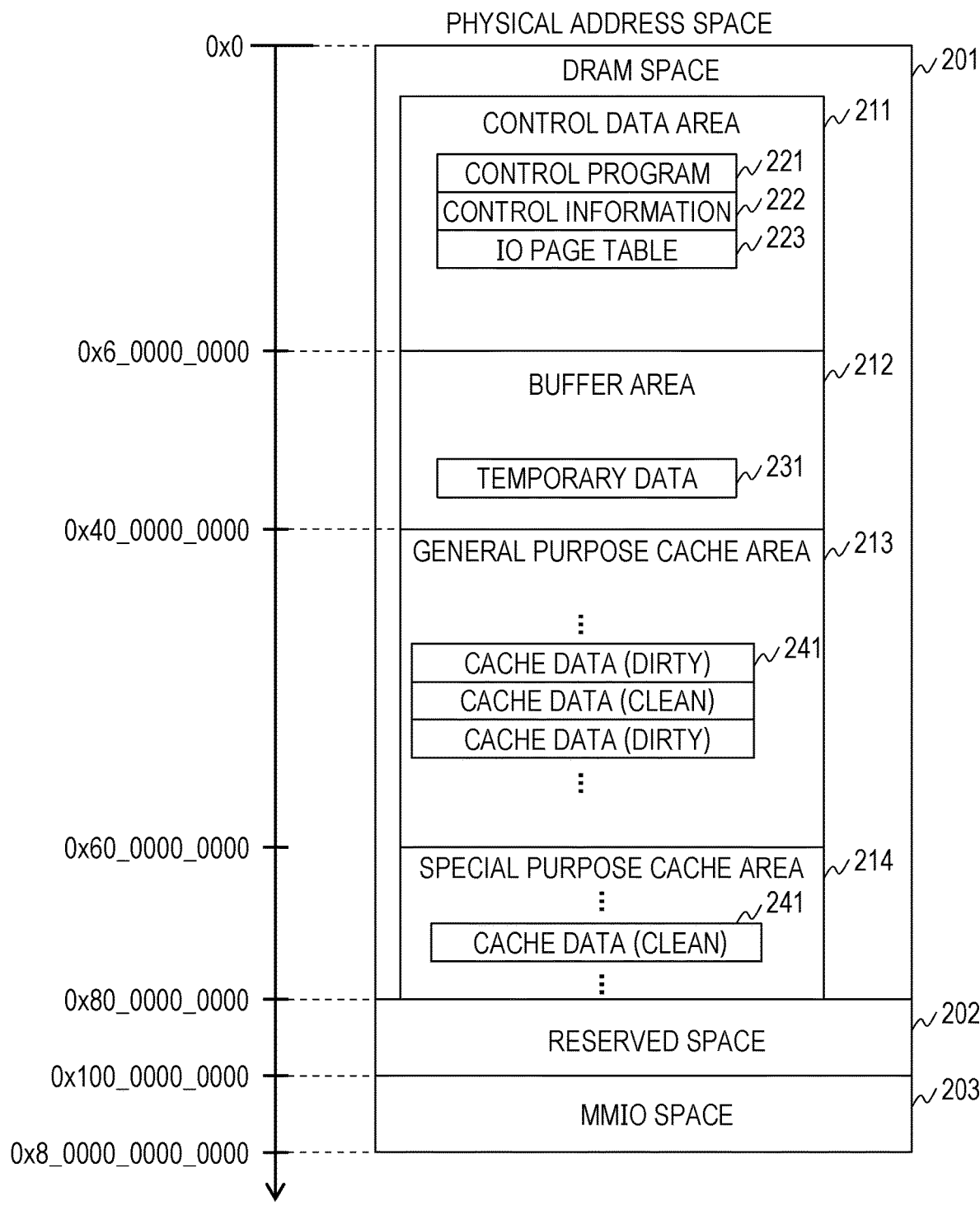
FIG. 2 is a diagram showing a physical address space managed by a controller of the first embodiment.

FIG. 2 is a diagram showing a physical address space managed by a controller 120 of the first embodiment. The physical address space includes a DRAM space 201, a reserved space 202, and a memory-mapped I/O (MMIO) space 203.

The reserved space 202 is an inaccessible address space. The MMIO space 203 is an address space used to access an IO device. The controller 120 manages the physical address space so as to prohibit access (write) to the reserved space 202 and the MMIO space 203 from the storage drive 151.

The DRAM space 201 is an address space to be used for accessing the memory 131. The DRAM space 201 includes an address space to which a control data area 211, a buffer area 212, a general purpose cache area 213, and a special purpose cache area 214 of the memory 131 are mapped.

The control data area 211 is a storage area for storing programs and information configured to control the storage system 100. The control data area 211 stores a control program 221, control information 222, an IO page table 223, and the like.

The control program 221 is a program for achieving a control function (storage control unit) of the storage system 100. The control information 222 is information for controlling the storage system 100. The control information 222 includes, for example, a cache directory, data for managing temporary data 231 stored in the buffer area 212, data for managing the cache data 241 stored in the general purpose cache area 213 and the special purpose cache area 214, commands for controlling various devices, and data shared between the controllers 120. The control information 222 includes data for managing the RAID configuration and information for managing the correspondence between the storage area provided in the host terminal 104 and the storage drive 151.

Note that the cache directory of the first embodiment is managed in units called segments having a size of 64 kB. Specifically, the cache directory is managed as a list of a segment state, least recently used (LRU) information, most recently used (MRU) information, a bitmap indicating whether the state is a dirty state or a clean state, a physical address of the memory 131, and the like. On the other hand, the temporary data 231 is managed in units of 1 kB. Specifically, information, such as a bitmap for managing occupation and non-occupation of an area of temporary data and a transaction identification (ID) of an occupied control program, is managed.

The IO page table 223 is a table that the IOMMU 141 uses to control access to the memory 131 by the storage drive 151. In the first embodiment, one IO page table 223 is generated for each storage drive (NVMe Drive) 151. A plurality of IO page tables 223 are managed by IO page table management information 500 (cf. FIG. 5). The IO page table 223 and the IO page table management information 500 will be described in detail with reference to FIGS. 3 and 5.

The core 140 can set and update the IOMMU 141. Further, the core 140 can manipulate the registers of the IOMMU 141 to invalidate the IO page table 223 to be used by the IOMMU 141 and cache the IO page table 223.

The buffer area 212 is a storage area in which the control program temporarily holds and stores the original data, the intermediate data, or the temporary data 231, which is the final data, of the operation or the IO processing. The temporary data 231 is typically discarded after completion of the IO processing. The controller 120 manages the buffer area 212 so as to permit access (write) from the storage drive 151 to the buffer area 212.

In the first embodiment, a plurality of cache areas having different access attributes are set for each storage drive (NVMe drive) 151. Specifically, a cache area (second cache area) in which the writing of data by one storage drive 151 is permitted is set, and a cache area (first cache area) in which the writing of data is permitted is set. In the following description, the cache area in which the writing of data is prohibited will be described as the general purpose cache area 213, and the cache area in which the writing of data is permitted will be described as the special purpose cache area 214.

The general purpose cache area 213 is a storage area for storing the cache data 241. The cache data 241 may include cache data 241 in a dirty state (dirty data) and cache data 241 in a clean state (clean data).

The cache data 241 in the dirty state is data existing only in the memory 131. The cache data 241 in the clean state is data destaged to the storage drive 151. The cache data 241 in the dirty state is destaged to the storage drive 151 and then managed as the cache data 241 in the clean state.

When failure occurs in the controller 100, the cache data 241 in the clean state can be restored by being read from the storage drive 151, but it is difficult to restore the cache data 241 in the dirty state. Therefore, the cache data 241 in the dirty state is redundant among the plurality of controllers 120. After the cache data 241 in the dirty state is destaged to the storage drive 151, the redundant configuration can be released. Since the general purpose cache area 213 stores cache data 241 in the dirty state, the writing of data by the storage drive 151 is prohibited to prevent data loss due to the unauthorized memory access of the storage drive 151.

The special purpose cache area 214 is a storage area for storing the cache data 241 in the same manner as the general purpose cache area 213 but is used only at the time of staging-in-advance (to be detailed later) in a sequential read process. Therefore, only the cache data 241 in the clean state exists in the special purpose cache area 214, and the storage of the cache data in the dirty state is prohibited in the special purpose cache area 214.

Figure 3:
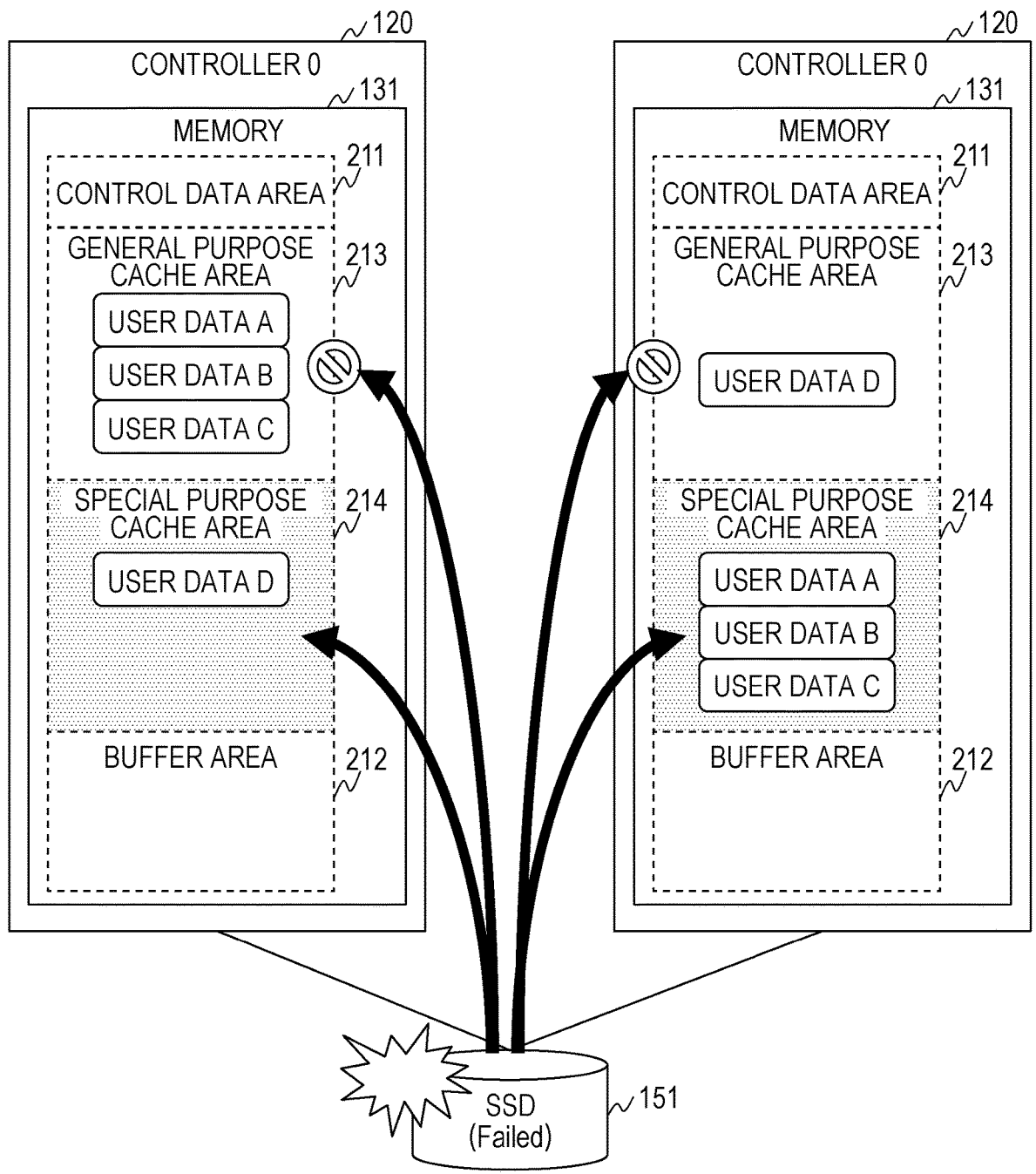
FIG. 3 is a diagram showing an example of the use of a special purpose cache area and a general purpose cache area of the first embodiment.

By controlling to place only the cache data 241 in the clean state in the special purpose cache area 214, even when the cache data 241 in the clean state is lost due to the unauthorized memory access of the storage drive 151, the cache data 241 in the clean state can be recovered by being read again from the storage drive 151. Thus, in the special purpose cache area 214, the writing of data by the storage drive 151 is permitted. As described above, the destruction of data in the cache area 214 due to the writing of corrupted data from the storage drive (NVMe drive) 151 is prevented (FIG. 3). In another example, in the special purpose cache area 214, the storage of cache data for the non-sequential read process may be permitted.

For example, the discarding of data stored in the general purpose cache area 213 is determined based on the possibility of re-reference of the data. For example, data that has passed a predetermined period without being referenced is discarded. The data stored in the special purpose cache area 214 is discarded after a predetermined time elapses regardless of whether or not the data has been referenced.

Next, information managed by the storage system 100 will be described with reference to FIGS. 4 and 5. FIG. 4 is a diagram showing an example of storage drive correspondence information 300 included in the control information 222 of the first embodiment; In the first embodiment, the storage drive 151 is managed as a virtual storage drive in order to achieve the configuration of a flexible RAID group and the maintenance (insertion and removal) of the storage drive 151.

The storage drive correspondence information 300 is information for managing the correspondence in identification information between the storage drive 151 and of the virtual storage drive. The storage drive correspondence information 300 includes an entry made up of a virtual drive ID 301 and a physical drive ID 302. There is one entry for one storage drive 151.

The virtual drive ID 301 is a field for storing identification information of the virtual storage drive. The physical drive ID 302 is a field for storing identification information of the storage drive 151. The controller 120 performs various controls using the identification information stored in the virtual drive ID 301.

For simplicity of description, numerals are used as the identification information of the storage drive 151 and the virtual storage drive, but generally, the identification information of the storage drive 151 and the virtual storage drive is made up of a peripheral component interconnect (PCI) bus number, a device number, and a function number.

FIG. 5 is a diagram showing an example of the data structure of the IO page table management information 500 of the first embodiment. The IO page table management information 500 includes a plurality of IO page tables 223. The IO page table management information 500 includes an entry made up of a drive ID 501, a physical address 502, a page size 503, and a memory access attribute 504. One entry corresponds to one IO page table 223. In the first embodiment, one IO page table 223 exists for one storage drive 151 (virtual storage drive).

One entry includes a row in which information regarding access control for a storage area (page) of a predetermined size is set. In the following description, the row is referred to as a page table entry.

The drive ID 501 is a field for storing identification information of the virtual storage drive corresponding to the storage drive 151. The physical address 502 is a field for storing a starting physical address of a storage area (page) to be accessed. The page size 503 stores the size of the storage area (page) to be accessed. The size can be set to various values depending on the system, such as 4 kB, 2 MB, and 1 GB.

The memory access attribute 504 is a field group for storing an access attribute with respect to the storage area (page) to be accessed. The memory access attribute 504 includes Read 505 and Write 506. The Read 505 is a field for storing an attribute related to the reading of data with respect to the storage area (page). The Read 505 stores either "Allowed" indicating that reading is possible or "Disallowed" indicating that reading is impossible.

The Write 506 is a field for storing attributes related to the writing of data with respect to the storage area (page) to be accessed. The Write 506 stores either "Allowed" indicating that writing is possible or "Disallowed" indicating that writing is impossible.

In the case of the storage system 100 not including the NVMe drive, only one IO page table 223 is generated. In this case, the drive ID 501 of the entry is blank.

The IO page table management information 500 is created when the storage system 100 is started up, and the setting is applied. The IO page table management information 500 is rewritten as necessary by the storage system 100 in response to a maintenance operation triggered by drive failure, expansion, or the like. In the present specification, a detailed description of the processing is omitted.

Next, the processing executed in the computational system will be described in detail. The IO processing will be described with reference to FIGS. 6 to 12. It is assumed that the storage drive 151 to be subjected to the IO processing is an NVMe drive.

Figure 6:
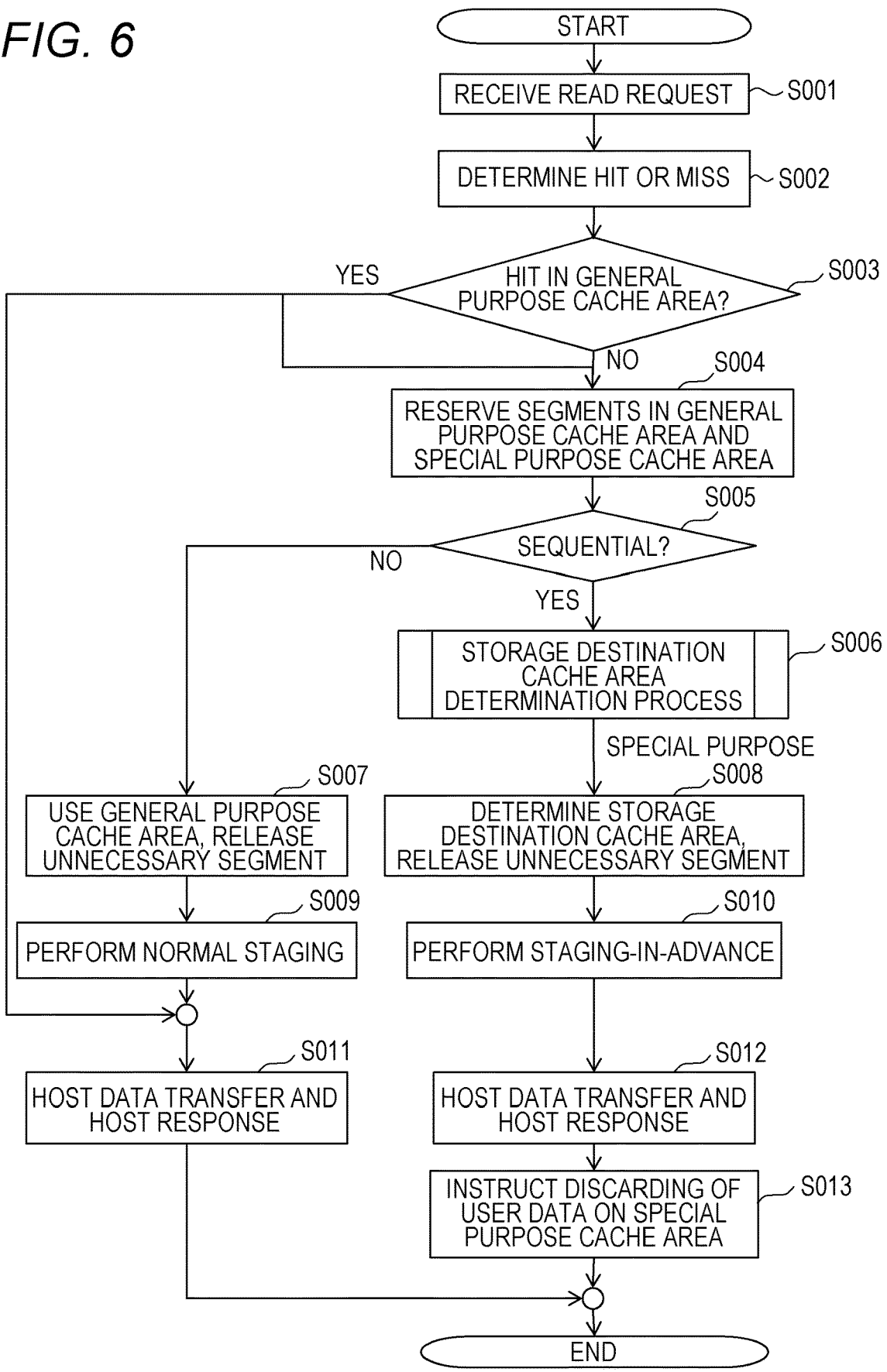
FIG. 6 is a flowchart for explaining IO processing that is executed by the storage system of the first embodiment upon receipt of a read request.

FIG. 6 is a flowchart for explaining the IO processing that is executed by the storage system 100 of the first embodiment upon receipt of a read request from the host terminal 104. When a read request is received from the host terminal 104 (step S001), the core 140 of one controller 120 determines whether data requested by the host terminal 104 exists in the general purpose cache area 213 or the special purpose cache area 214 (step S002). Specifically, the core 140 refers to the cache directory and determines whether or not data to be a target for a read request exists in the general purpose cache area 213 or the special purpose cache area 214. Note that the read request includes various pieces of identification information such as data length, data storage destination information (logical block addressing: LBA), and data storage destination identification information (LU). The core 140 specifies an NVMe drive for writing data into the memory 131 based on the control information 222 and the information included in the read request.

When the requested data exists in the general purpose cache area 213 (S003: YES), the core 140 proceeds to step S011. In step S011, the core 140 causes the host interface 133 to transfer user data cached in the general purpose cache area 213 to the host and causes the host to make a response of processing completion. The core 140 may use the node interface 132 to cause a host to transfer data and respond via another controller 120.

Regardless of whether or not the requested data exists in the general purpose cache area 213 (S003: YES or NO), the core 140 proceeds to step S004. In step S004, the core 140 reserves a transfer destination area on the cache area in order to stage the user data from the storage drive 151 to the cache area. Since it is impossible to determine which cache area to use at this time, the core 140 reserves both the general purpose cache area 213 and the special purpose cache area 214.

Next, the core 140 analyzes the request information of the host terminal 104 and determines whether the access pattern is sequential access or not (S005). A criterion for determining whether the access pattern corresponds to the sequential access may be any criterion. The access pattern may be determined as the sequential access, for example, when the transfer length has exceeded a specific threshold (example: 32 kB), when the LBA of the current read request is continuous with the LBA of the previous read request, in other words, when the difference between the LBA of the previous request and the LBA of the current request is equal to the transfer length of the current request, or when a combination of these conditions is met.

When the read request is not sequential access, that is, when the read request is random access (S005: NO), the core 140 performs a normal staging process of staging the data of the requested transfer length of the host from the storage drive 151 to the general purpose cache area 213.

First, in step S007, the core 140 releases the segment reserved on the special purpose cache area 214 which is not used, and uses only the segment of the general purpose cache area 213. Next, in step S009, the core 140 performs the normal staging process. A description will be given with reference to FIG. 8. The core 140 instructs the drive 151 to transfer user data (user data N) of a transfer length requested by the host to the buffer area 212. Further, the core 140 moves the user data on the buffer area 212 to the general purpose cache area 213. By this operation, the staging to the general purpose cache area 213 is achieved. Upon completion of step S009, the core 140 proceeds to step S011.

When the read request is sequential access (S005: YES), the core 140 causes the storage drive 151 to perform a staging process peculiar to the sequential access called staging-in-advance. In the staging-in-advance, data is staged from the storage drive 151, including data expected to be read with the next host request in addition to data requested by the host terminal 104.

For example, the user data of 2 MB in which the LBA is continuous with the LBA of the host request as a starting point is also a staging target. By collecting and staging the user data by one host request, a cache hit can be aimed at in the next read request of the host, and the data can be quickly returned to the host. That is, the processing time required for staging from the storage drive 151 is concealed, and a fast response is achieved.

Therefore, in the staging-in-advance process, a faster response time can be achieved while the same throughput as that of the normal staging process is maintained. The staging-in-advance process can be applied to both the transfer to the general purpose cache area 213 via the buffer area 212 and the transfer to the special purpose cache area 214 which requires less memory accesses because the data can be transferred without using the buffer area 212.

As described above, in the normal staging, the transfer destination is the general purpose cache area 213, and hence the storage drive 151 cannot directly perform staging to the general purpose cache area 213. Therefore, the storage drive 151 transfers data to the read-write buffer area 212, and the core 140 moves the data from the buffer area 212 to the general purpose cache area 213, thereby achieving staging to the general purpose cache area 213 of the storage drive 151. Therefore, the access frequency of the memory 131 increases to cause deterioration in performance.

In the sequential access processing, by combining the staging-in-advance with the special purpose cache area 214, the number of memory accesses can be reduced compared with the normal staging using the buffer area 212, and more efficient data transfer can be achieved. Therefore, from the viewpoint of the number of memory accesses, the staging-in-advance process preferably uses the special purpose cache area 214 rather than the general purpose cache area 213.

However, there is a case where the special purpose cache area 214 is not available due to insufficient free area in the special purpose cache area 214 (the special purpose cache area 214 being exhausted) or some other reason. The general purpose cache area 213 may be preferable to the special purpose cache area 214 from a viewpoint different from the number of memory accesses.

Based on the above, in step S006, the core 140 performs a storage destination cache determination process for determining the proper use of the general purpose cache area 213 and the special purpose cache area 214. The core 140 issues an instruction to perform the staging-in-advance on the selected cache area. Indications are managed using table entry values, bitmaps, flags, and the like. The storage destination determination process will be described in detail later with reference to FIG. 7.

In step S008, the core 140 allocates a segment as a storage destination of the staging data based on the determination result in step S006. The reserved area of the special purpose cache area 214 or the general purpose cache area 213, which becomes unnecessary, is released to be reusable.

Figure 9:
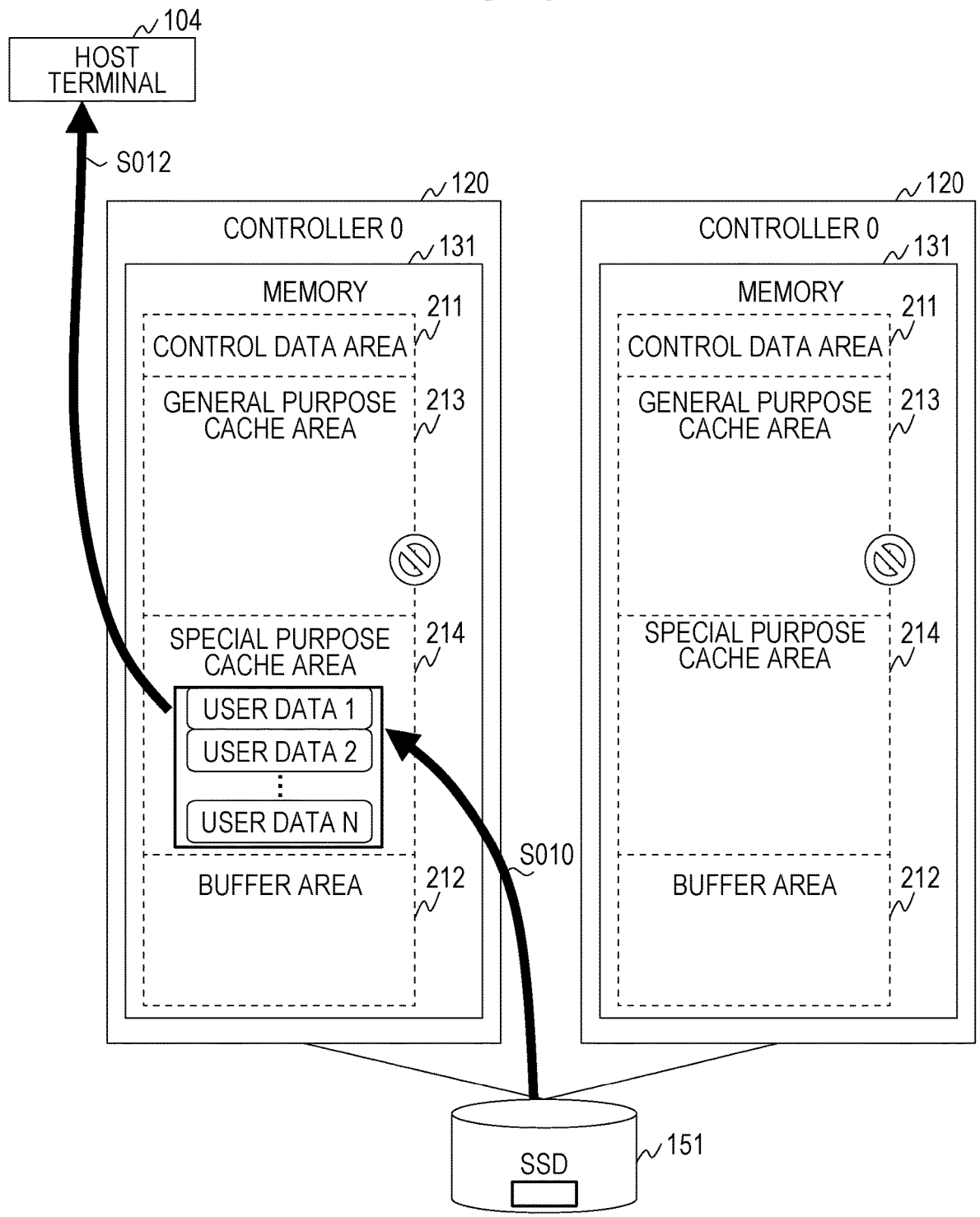
FIG. 9 is a diagram for explaining a data flow when the special purpose cache area is selected in the 10 processing that is executed by the storage system of the first embodiment upon receipt of a read request.

In step S010, the core 140 causes the storage drive 151 to perform a staging-in-advance process peculiar to sequential access. FIG. 9 shows an example of staging-in-advance. In the example of FIG. 9, the user data is transferred to the special purpose cache area 214 (S009).

As shown in FIG. 9, the staging-in-advance is performed from the storage drive 151, including data expected to be read in the next and subsequent host requests (e.g., user data 3 to user data N), in addition to data requested by the host terminal 104 (e.g., user data 1 and user data 2). For example, the user data of 2 MB in which the LBA is continuous with the LBA of the host request as a starting point is a staging target.

In step S012, the core 140 causes the host interface 133 to transfer the user data staged in step S010 to the host and causes the host to make a response of processing completion. The core 140 may use the node interface 132 to cause the host to transfer data and respond via another controller 120.

Next, in step S013, the core 140 discards the staging data remaining on the special purpose cache area 214 after the host response and releases the segment storing the data so as to be reusable. The data stored in the special purpose cache area 214 is discarded in response to the transmission of the data to the host terminal 104, thereby reducing the possibility that the free area of the special purpose cache area 214 is exhausted.

Figure 7:
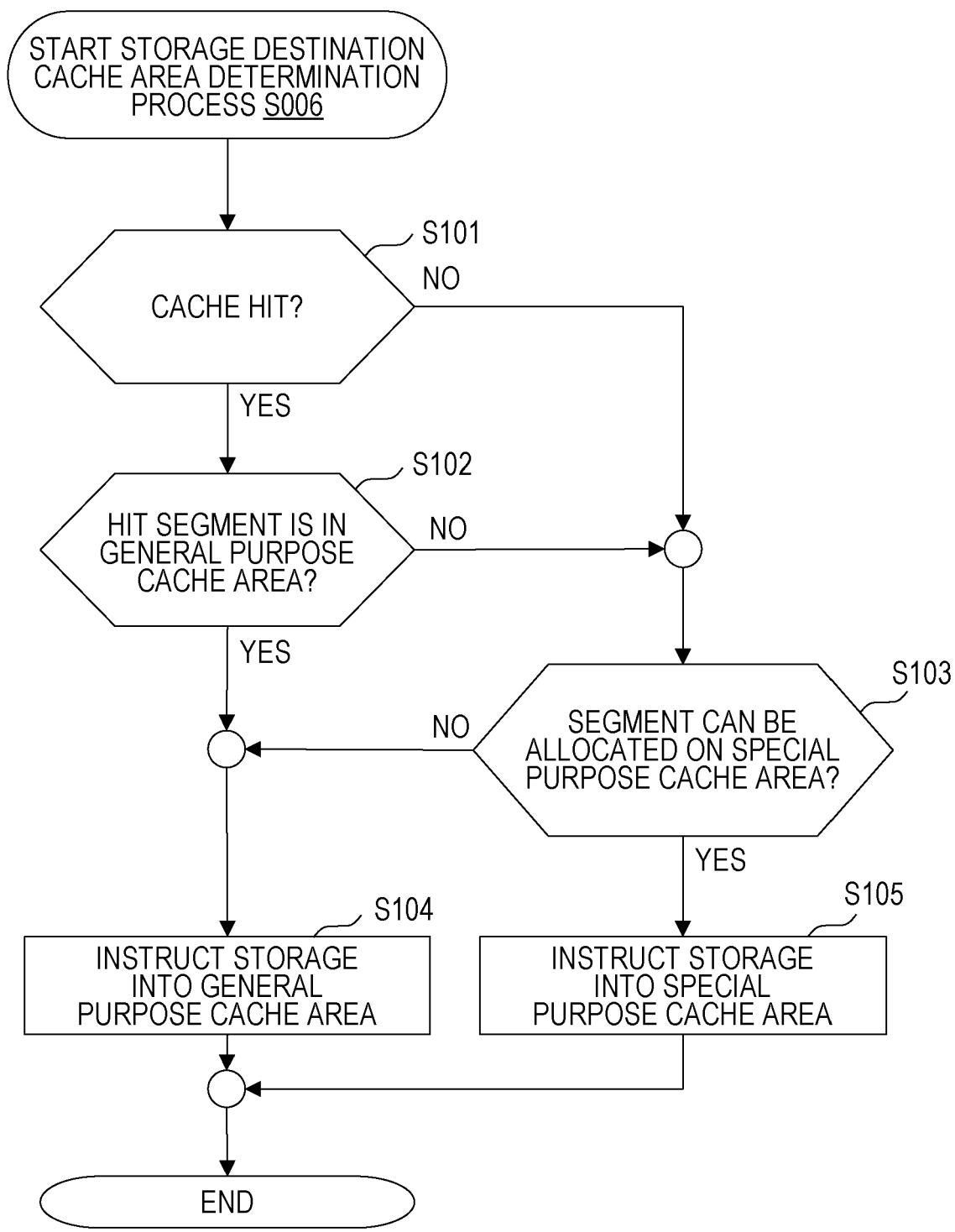
FIG. 7 is a flowchart for explaining a cache area selection process in the 10 processing that is executed by the storage system of the first embodiment upon receipt of a read request.
Figure 8:
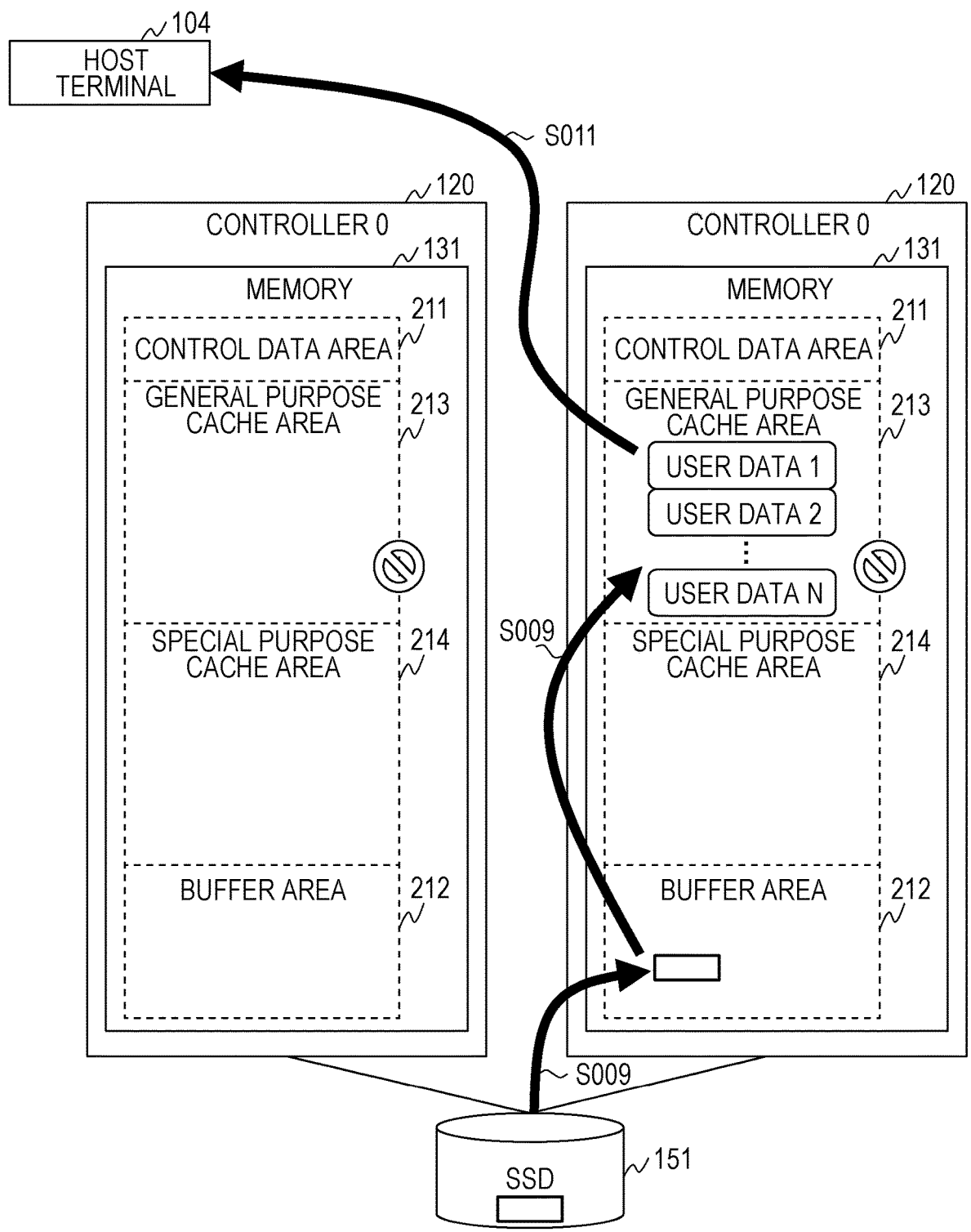
FIG. 8 is a diagram for explaining a data flow when the general purpose cache area is selected in the 10 processing executed by the storage system of the first embodiment upon receipt of a read request.

FIG. 7 shows a determination process for the staging destination cache area in step S006. In step S101, the core 140 refers to the determination result in step S002 to determine whether the hit-miss determination result of the host request is a cache hit. When the determination result is a cache hit (S101: YES), the core 140 proceeds to step S102, and when the determination result is a cache miss, the core 140 proceeds to step S103.

In step S102, it is determined whether the storage cache area of the user data hit by the core 140 is the general purpose cache area 213 or the special purpose cache area 214. When the user data is stored in the general purpose cache area 213, the core 140 determines that the user data is not available due to the reason that the user data is highly likely to be referred again or that the free area of the special purpose cache area 214 is insufficient. The core 140 instructs the general purpose cache area 213 to store data from the storage drive 151 (step S105).

On the other hand, when the user data is stored in the special purpose cache area 214, it is determined that the user data is staged as a part of the sequential access process. The core 140 proceeds to step S103 for determining whether or not the special purpose cache area 214 is available.

In step S103, the core 140 refers to the cache directory and determines whether an available segment has been allocated (reserved) on the special purpose cache area 214. When the segment is allocated (S103: YES), the core 140 instructs the storage of data from the storage drive 151 into the special purpose cache area 214 (step S105). When the free area of the special purpose cache area 214 is insufficient for storage of data by the staging-in-advance and the segment is not allocated, use of the general purpose cache area 213 is instructed (step S104).

In the above example, when the user data requested by the read request is stored in the general purpose cache area 213, the user data that is read in advance is stored into the general purpose cache area 213. In another example, the core 140 may cause the user data that is read in advance to be stored into the special purpose cache area 214 regardless of the type of cache area that has a cache hit. This can reduce the number of memory accesses.

Figure 10:
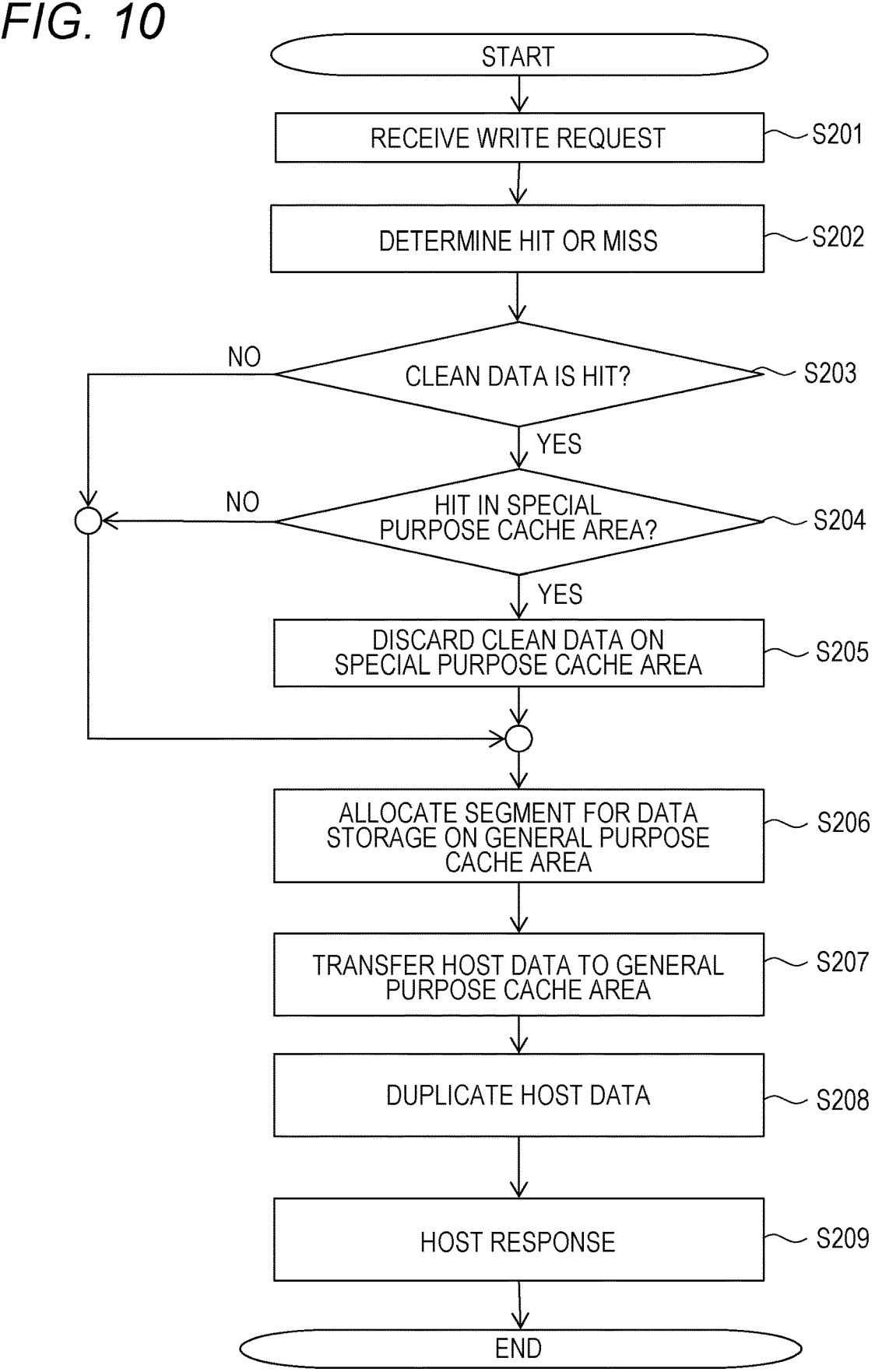
FIG. 10 is a flowchart for explaining 10 processing that is executed by the storage system of the first embodiment upon receipt of a write request.

FIG. 10 is a flowchart for explaining IO processing that is executed by the storage system 100 of the first embodiment upon receipt of a write request. When a write request is received from the host terminal 104 (step S201), the core 140 of one controller 120 determines whether cache data in a clean state (clean data) has a cache hit (steps S202 and S203).

Specifically, the core 140 refers to the cache directory and determines whether or not data to be a target for a write request exists in the general purpose cache area 213 or the special purpose cache area 214.

When determining that a cache hit has occurred (S203: YES), the core 140 proceeds to step S204. When determining that the cache hit has not occurred (S203: NO), the core 140 executes a storage area allocation process on the general purpose cache area 213 (step S206).

In step S204, it is determined whether or not the user data hit by the core 140 is in the special purpose cache area 214. When the data of the specified address of the write request is stored in the special purpose cache area 214 (S204: YES), the core 140 proceeds to step S205. When the data is not stored in the special purpose cache area 214 (S204: NO), the core 140 proceeds to step S206.

In step S205, the core 140 discards the clean data on special purpose cache area 214. Since dirty data cannot be placed on the special purpose cache area 214, the core 140 allocates a segment on the general purpose cache area 213 and places the dirty data. Thus, unless the clean data on the special purpose cache area 214 is discarded, the management of new and old data is required for compensating the consistency of the user data, and the processing becomes complicated. Discarding the clean data simplifies the processing.

Figure 11:
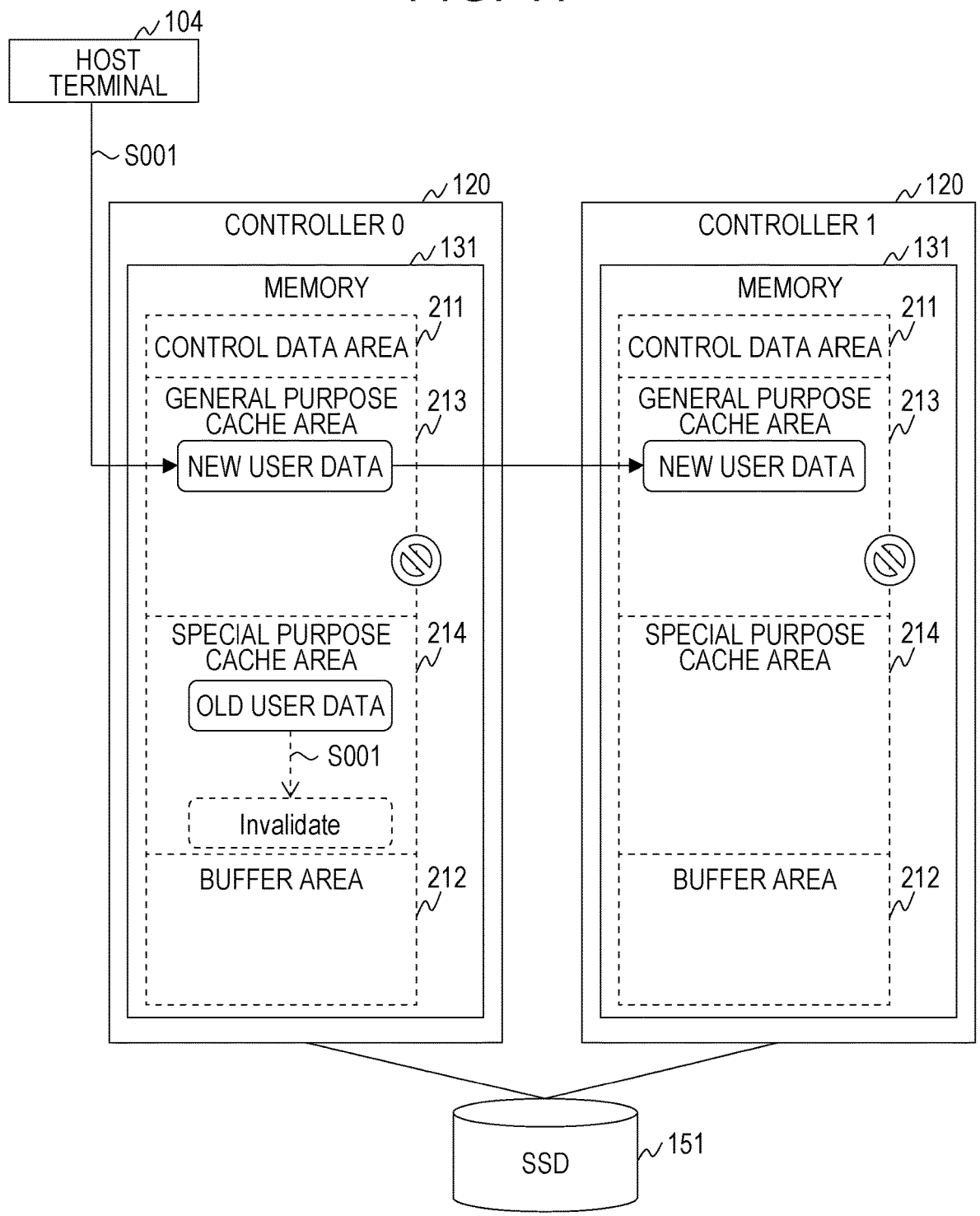
FIG. 11 is a diagram for explaining a data flow of the 10 processing executed by the storage system of the first embodiment upon receipt of a write request.

In step S206, for placing dirty data transferred from the host terminal 104, the core 140 allocates a segment on the general purpose cache area 213. In step S207, the core 140 transfers the dirty data (new user data) to the memory 131 of another node 110 by using the core 140 or the node interface 132 in order to make the dirty data (new user data) redundant, as shown in FIG. 11.

Second Embodiment

Next, in addition to the first embodiment, a second embodiment in which data transfer control is switched under a high-load condition will be described with reference to FIGS. 12 to 14. When the sequential read is highly loaded, the special purpose cache area 214 is used frequently. When the special purpose cache area 214 is not sufficiently prepared, the free area of the special purpose cache area 214 cannot be allocated when the staging-in-advance process is performed, and the general purpose cache area 213 is used. As a result, the memory access amount may increase, and the performance may deteriorate. Therefore, in the present embodiment, a new staging method is introduced, whether or not the load is high is determined based on a preset criterion, and the staging method is selectively used in accordance with the determination result, thereby preventing deterioration in performance even under a high-load condition.

Figure 12:
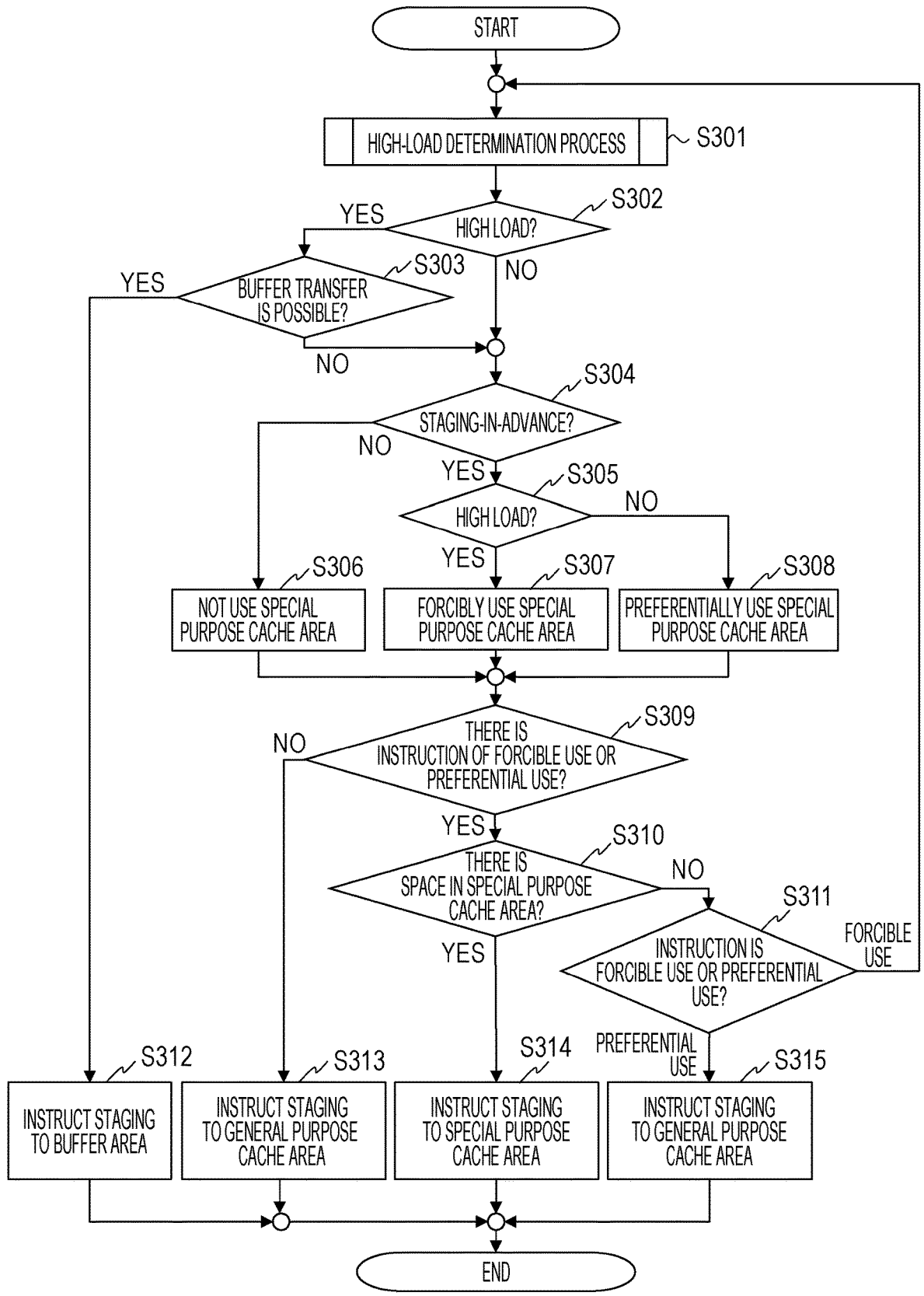
FIG. 12 is a flowchart for explaining a staging destination determination process that is executed by a storage system of a second embodiment.

FIG. 12 is a flowchart for explaining a process in which the core 140 performs a high-load determination process and switches the staging method. In step S301, the core 140 determines whether the storage system 100 is in a high-load state. Details of the process will be described later with reference to FIG. 13. In step S302, the core 140 receives the process result in step S301 and switches the staging method in accordance with whether or not the load is high. When determining that the storage system 100 is in a high-load state, the core 140 proceeds to step S303. When determining that the storage system 100 is not in a high-load state, the core 140 proceeds to step S304.

In step S303, the core 140 determines whether buffer transfer to the storage drive 151 can be performed. The buffer transfer is a data transfer process in which user data is transferred to the host terminal 104 via the buffer area 212, which is not managed by the cache directory and stores temporary data accessible by the storage drive 151, without passing through the cache area. The amount of staging data to the cache area can be reduced by the buffer transfer.

Since the buffer transfer does not perform cache control, the user data after the transfer cannot be reused, and the user data is discarded. The buffer transfer is managed for each IO processing and synchronized with the staging of the storage drive 151, so that the processing time required for the staging of the storage drive 151 cannot be concealed, unlike the staging-in-advance in which the staging processing time due to a cache hit can be concealed. Therefore, the buffer transfer has a feature that the memory access amount is small, but the response performance is low.

In determining whether or not the buffer transfer is possible, it is confirmed that there is a free area for storing data in the buffer area 212, and when there is a free area, it is determined that the transfer is possible. When determining that the transfer is possible (S303: YES), the core 140 proceeds to step S312 and when determining that the transfer is not possible (S303: NO), the core 140 proceeds to step S304.

In step S304, the core 140 determines whether or not the type of the staging request for the storage drive 151 is staging-in-advance. When the type is not staging-in-advance (S304: NO), the core 140 proceeds to step S306 and when the type is staging-in-advance (S304: YES), the core 140 proceeds to step S305. In step S305, the core 140 makes a condition determination as to whether or not the storage system is in a high-load state. Step S305 is the same as step S302, and the processing result of step S302 may be used. A threshold used in step S305 may be a threshold different from, for example, lower than, a threshold used in step S302.

In step S306, the core 140 determines not to instruct the storage drive 151 to use the special purpose cache area 214. In step S307, the core 140 determines to instruct the storage drive 151 to forcibly use the special purpose cache area 214. The core 140 determines that the storage system is in a high-load state and there is a possibility that the free area of the special purpose cache area 214 becomes insufficient, and instructs the forced use of the special purpose cache area 214.

In step S308, the core 140 determines to instruct the storage drive 151 to preferentially use the special purpose cache area 214. Although the storage system is in a high-load state, the core 140 determines that there is little possibility of the shortage of the free area in the special purpose cache area 214, and instructs the preferential use of the special purpose cache area 214. In step S309, the core 140 determines whether the forcible use or the preferential use has been instructed. When either use has been instructed (S309: YES), the core 140 proceeds to step S310 and when neither use has been instructed (S309: NO), the core 140 proceeds to step S313.

In step S310, the core 140 determines whether there is a free area for storing data in the special purpose cache area 214. When there is any free area (S310: YES), the core 140 proceeds to step S314 and when there is no free area (S310: NO), the core 140 proceeds to step S311. In step S311, the core 140 determines whether the instruction is the instruction of the forcible use or the instruction of the preferential use. When the instruction of the forcible use (S311: forcible use), the core 140 returns to step S301. When the instruction is the instruction of the preferential use (S311: preferential use), the core 140 proceeds to step S315.

As described above, when it is determined that the processing load is high (instruction of forcible use) and there is no free area in the special purpose cache area 214 for storing the data by the staging-in-advance, the staging-in-advance is awaited. When it is determined that the processing load is not high (instruction of preferential use), the general purpose cache area 213 is selected as a staging destination of data by the staging-in-advance. Thus, the staging destination can be appropriately selected in accordance with the processing load and the state of the cache area.

In step S312, the core 140 instructs the storage drive 151 to perform staging to the buffer area 212. FIG. 14 shows a data flow of a response to the host terminal 104 by using the buffer transfer. The user data 1 is written from the storage drive 151 into the buffer area 212 and further transferred from the buffer area 212 to the host terminal 104 without passing through a cache area.

In steps S313 and S315, the core 140 instructs the storage drive 151 to perform staging to the general purpose cache area 213. In step S314, the core 140 instructs the storage drive 151 to perform staging to the special purpose cache area 214.

Figure 13:
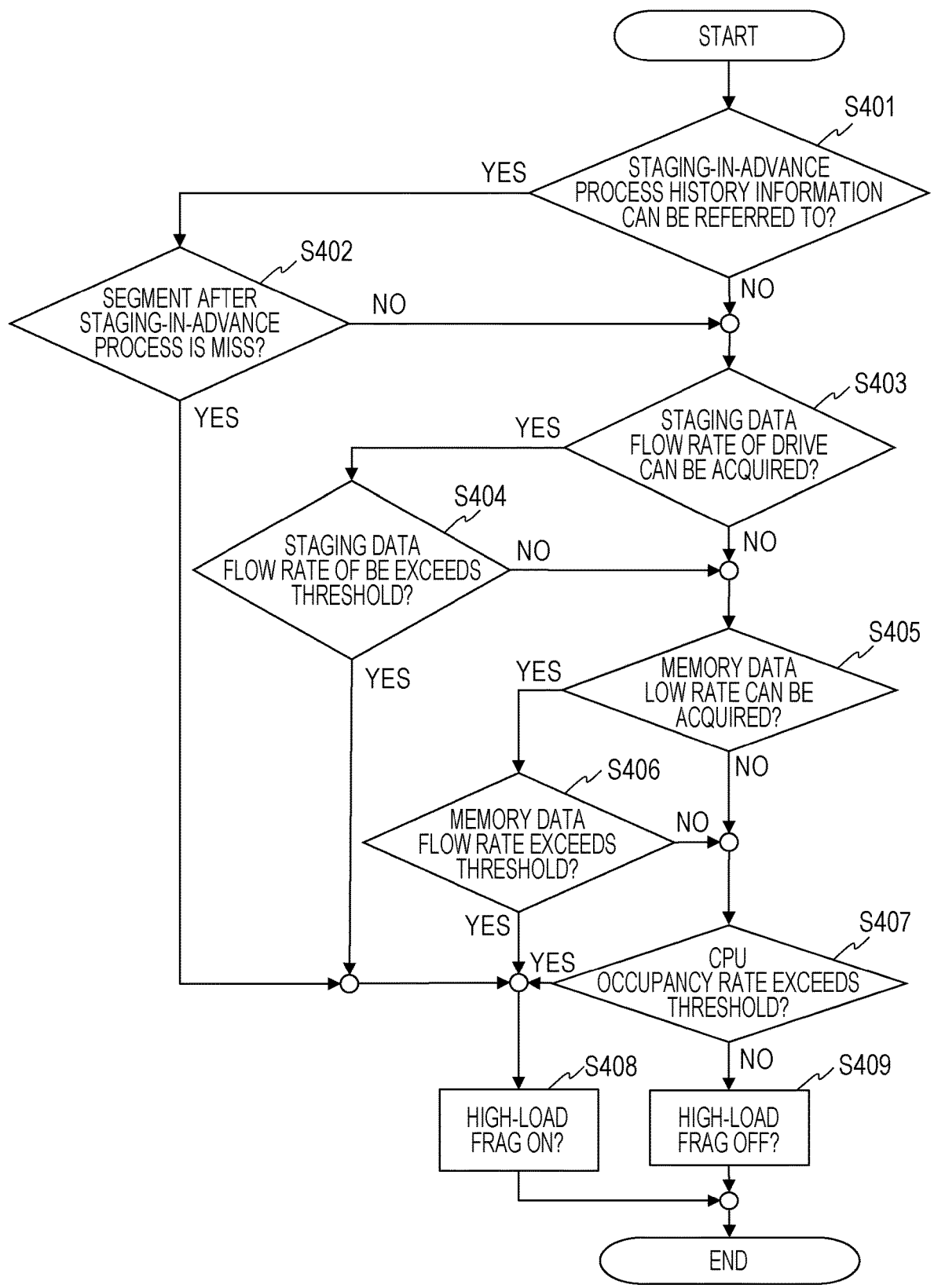
FIG. 13 is a flowchart for explaining a high-load state determination process that is executed by the storage system of the second embodiment.
Figure 14:
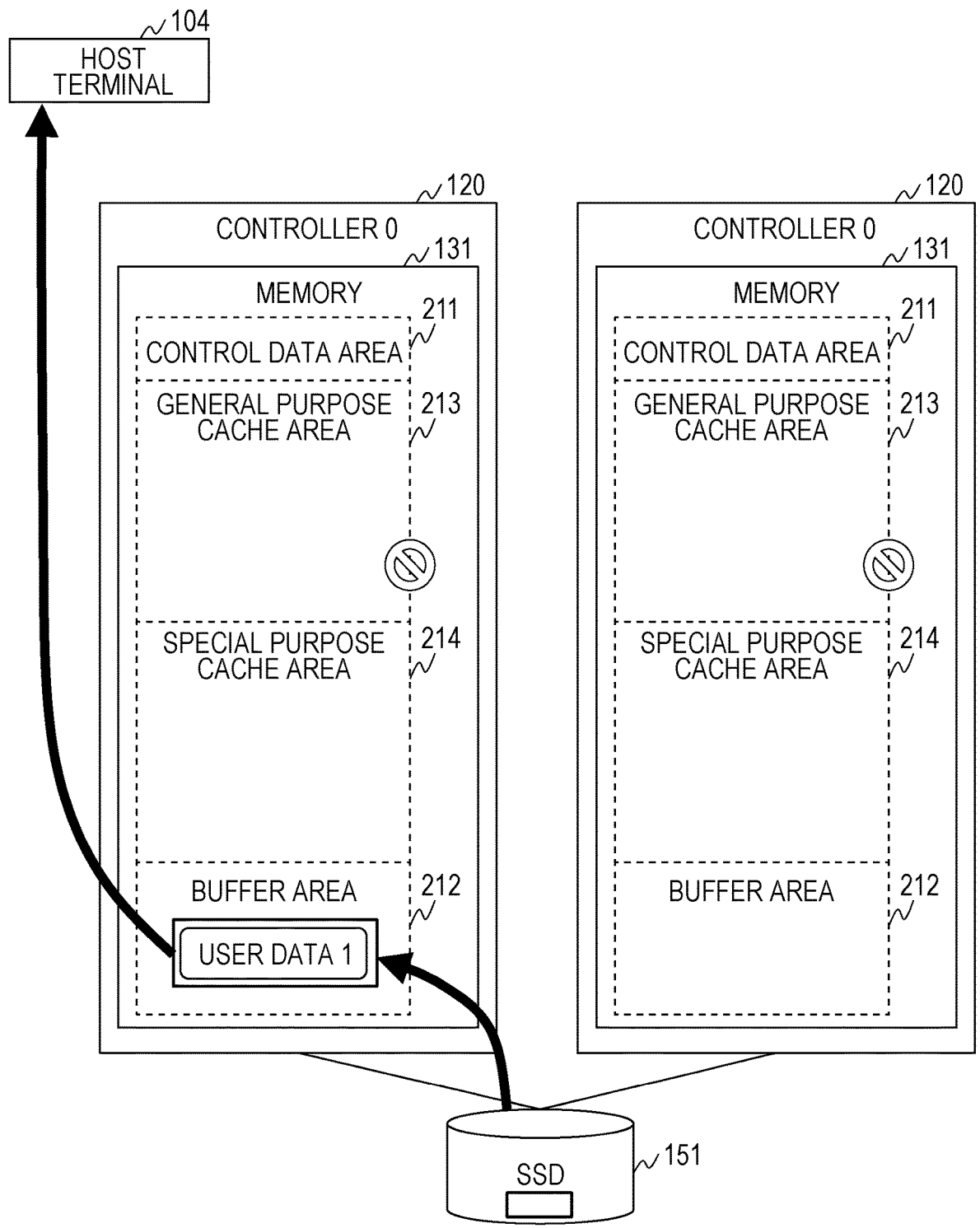
FIG. 14 is a diagram for explaining a data flow when a buffer transfer is selected in IO processing that is executed by the storage system of the second embodiment upon receipt of a read request.

FIG. 13 is a flowchart of a process in which the core 140 determines whether the storage system is in a high-load state. In step S401, the core 140 determines whether or not the staging-in-advance process history information (not shown) can be referred to.

The staging-in-advance process history information is managed with a table or a list included in the control information 222. The staging-in-advance process history information includes, for example, information such as whether or not the staging-in-advance process was performed in the past and the hit-miss determination result of the staging data by the staging-in-advance in the past. When the main data cannot be referred to or does not exist (S401: NO), the core 140 proceeds to step S403 and when the main data can be referred to (S401: YES), the core 140 proceeds to step S402.

In step S402, the core 140 refers to the staging-in-advance process history information to determine whether the segment staged by the staging-in-advance process immediately before is a cache miss. When the determination result is a cache miss (S402: YES), the core 140 estimates a state in which the staging-in-advance is not sufficient and determines that the load is high (step S408). When the determination result is a cache hit (S402: YES), the core 140 proceeds to step S403.

In step S403, the core 140 determines whether or not the staging data flow rate information of the storage drive 151 can be acquired. When statistical information such as the amount of staging data in the storage drive 151, the number of times, frequency, and time has been collected in the control program, the flow rate of data staged in the storage drive 151 can be calculated. When determining that the data flow rate information can be obtained (S403: YES), the core 140 proceeds to step S404 and when determining that the data flow rate information cannot be obtained (S403: NO), the core 140 proceeds to step S405.

In step S404, the core 140 determines whether the flow rate of the staging data in the storage drive 151 has exceeded a threshold. When statistical information such as the amount of staging data in the storage drive, the number of times, frequency, and time can be collected in the control program and the flow rate of the staging data has exceeded a set threshold (S404: YES), the core 140 determines that the load is high (step S408). When the flow rate of the staging data has not exceeded the set threshold (S404: NO), the core 140 proceeds to step S405. The threshold can be preset by a user or a designer because the condition varies depending on the hardware configuration of the storage system. In this way, by referring to the flow rate of the staging data, the processing load can be appropriately determined in order to determine the staging destination.

In step S405, the core 140 determines whether data flow rate information (memory data flow rate information) of the memory 131 can be acquired. When statistical information such as the amount of data of the memory, the number of times, the frequency, and the time has been collected by a performance counter of the CPU in the control program, the data flow rate of the memory can be calculated. When determining that the data flow rate information can be obtained (S405: YES), the core 140 proceeds to step S406 and when determining that the data flow rate information cannot be obtained (S405: NO), the core 140 proceeds to step S407.

In step S406, the core 140 acquires the data flow rate information of the memory 131 and determines whether the data flow rate has exceeded a threshold. When statistical information such as the amount of data of the memory, the number of times, the frequency, and the time can be collected by a performance counter of the CPU in the control program and the data flow rate has exceeded a set threshold (S406: YES), the core 140 determines that the load is high (step S408). When the data flow rate has not exceeded the set threshold (S406: NO), the core 140 proceeds to step S407. The threshold can be preset by the user or the designer because the condition varies depending on the hardware configuration of the storage system. In this way, by referring to the flow rate of the memory data, the processing load can be appropriately determined in order to determine the staging destination.

In step S407, the core 140 acquires CPU occupancy rate information and determines whether the CPU occupancy rate has exceeded a threshold. When the information of the performance counter of the core can be collected in the control program and the operation rate has exceeded a set threshold (S407: YES), the core 140 determines that the load is high (step S408). When the operation rate has not exceeded the set threshold (S407: NO), the core 140 determines that the load is not high (step S409).

The threshold can be preset by the user or the designer because the condition varies depending on the hardware configuration of the storage system. In this way, by referring to the CPU occupancy rate, the processing load can be appropriately determined in order to determine the staging destination. In the above example, the flow rate of the memory data, the flow rate of the staging data, and the CPU occupancy rate are referred to for determining a high load, but only some of these may be referred to.

Note that the present invention is not limited to the embodiments described above, but includes various modifications. Further, for example, the above embodiments have been described in detail to describe the present invention in an easy-to-understand manner and are each not necessarily limited to an embodiment having all the configurations described above. Also, a part of the configuration of each embodiment can be added, deleted, or replaced with another configuration.

The present invention may be achieved by hardware by being designed with an integrated circuit or the like. The present invention can also be achieved by a program code of software that achieves the function of the embodiment. In this case, a storage medium in which a program code is recorded is provided to a computer, and a processor provided in the computer reads the program code stored in the storage medium. In this case, the program code itself read from the storage medium achieves the function of the embodiment described above, and the program code itself and the storage medium storing the program code constitute the present invention. As the storage medium for supplying such a program code, for example, a flexible disc, a compact disc read-only memory (CD-ROM), a digital versatile disc ROM (DVD-ROM), a hard disc, a solid-state drive (SSD), an optical disc, a magneto-optical disc, a compact disc-recordable (CD-R), magnetic tape, a non-volatile memory card, a ROM, or the like is used.

The program code achieving the function described in the present embodiment can be implemented in a wide range of program or script languages, such as assembler, C/C++, perl, Shell, PHP, Python, and Java (registered trademark). Further, the program code of the software for achieving the function of the embodiment may be distributed via a network to be stored into a storage means such as a hard disc or a memory of the computer or a storage medium such as a compact disc-rewritable (CD-RW) or a CD-R, and the processor provided in the computer reads and executes the program code stored in the storage means or the storage medium.

In the embodiments described above, the control lines and the information lines indicate those that are considered necessary for description, and not all control lines and information lines are necessarily shown in the product. All configurations may be interconnected.

What is claimed is:

1. A storage system comprising:
   a controller; and
   a storage drive accessible from the controller, wherein
   the controller includes a memory and a processing unit,
   the memory includes:
      the memory further includes a buffer area in which writing of data by the storage drive is permitted
      a first cache area in which writing of data by the storage drive is permitted, and
      a second cache area in which writing of data by the storage drive is prohibited,
      in the first cache area, storage of data, by staging-in-advance in response to a read request for a sequential read, by the processing unit is permitted, and storage of cache data in a dirty state by the processing unit is prohibited,
      in the second cache area, the storage of the cache data in the dirty state by the processing unit is permitted, and
      data from the storage drive to the second cache area is transferred via the buffer area.

2. The storage system according to claim 1, wherein in the first cache area, storage of data from the storage drive in response to a read request of a non-sequential read is prohibited.

3. The storage system according to claim 1, wherein when a free area of the first cache area is insufficient for storage of data by the staging-in-advance, the data by the staging-in-advance is stored into the second cache area via the buffer area.

4. The storage system according to claim 1, wherein first data stored in the first cache area is discarded in response to transmission to a host, and an area storing the first data is released.

5. A storage system comprising:
   a controller; and
   a storage drive accessible from the controller, wherein
   the controller includes a memory and a processing unit,
   the memory includes:
      a first cache area in which writing of data by the storage drive is permitted, and
      a second cache area in which writing of data by the storage drive is prohibited,
      in the first cache area, storage of data, by staging-in-advance in response to a read request for a sequential read, by the processing unit is permitted, and storage of cache data in a dirty state by the processing unit is prohibited, and
      in the second cache area, the storage of the cache data in the dirty state by the processing unit is permitted, wherein
      when second data with an address matching an address of a received write request is stored in the first cache area, the second data is discarded.

6. A storage system comprising:
   a controller; and
   a storage drive accessible from the controller, wherein
   the controller includes a memory and a processing unit configured to determine whether a processing load in the storage system is high based on a preset criterion,
   the memory includes:
      a first cache area in which writing of data by the storage drive is permitted, and
      a second cache area in which writing of data by the storage drive is prohibited,
      in the first cache area, storage of data, by staging-in-advance in response to a read request for a sequential read, by the processing unit is permitted, and storage of cache data in a dirty state by the processing unit is prohibited, and
      in the second cache area, the storage of the cache data in the dirty state by the processing unit is permitted, wherein
      staging of data by the staging-in-advance to the memory is awaited when the processing load is determined to be high and a free area of the first cache area is insufficient for storage of the data by the staging-in-advance, and
      the second cache area is selected as a staging destination of the data by the staging-in-advance when the processing load is determined not to be high.

7. The storage system according to claim 6, wherein the processing unit determines the processing load based on a flow rate of memory data of the memory.

8. The storage system according to claim 6, wherein the processing unit determines the processing load based on a flow rate of staging data of the storage drive.

9. A storage system comprising:
   a controller; and
   a storage drive accessible from the controller, wherein
   the controller includes a memory and a processing unit,
   the memory includes
      a buffer area in which writing of data by the storage drive is permitted,
      a first cache area in which writing of data by the storage drive is permitted, and
      a second cache area in which writing of data by the storage drive is prohibited,
      in the first cache area, storage of data, by staging-in-advance in response to a read request for a sequential read, by the processing unit is permitted, and storage of cache data in a dirty state by the processing unit is prohibited, and
      in the second cache area, the storage of the cache data in the dirty state by the processing unit is permitted, and
      the processing unit determines whether a processing load in the storage system is high based on a preset criterion, and
      when the processing load is determined to be high and the buffer area includes a free area for storage of data by the staging-in-advance, the data by the staging-in-advance is transferred to a host via the buffer area without via the first cache area and the second cache area.

* * * * *